H. S. McCORMICK AND A. GLAUBER.
AUTOMOBILE STEERING WHEEL LOCK.
APPLICATION FILED APR. 5, 1920.
1,411,047. Patented Mar. 28, 1922.
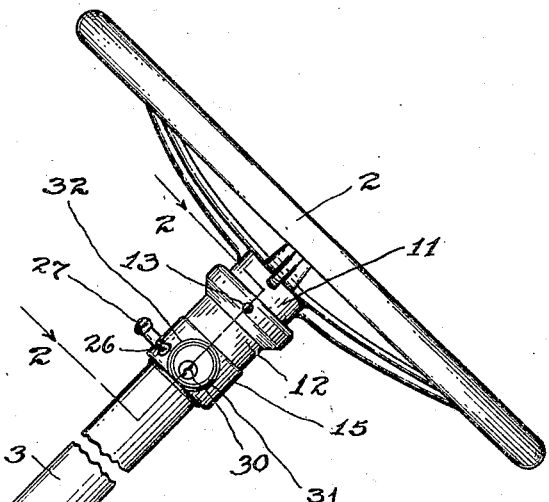
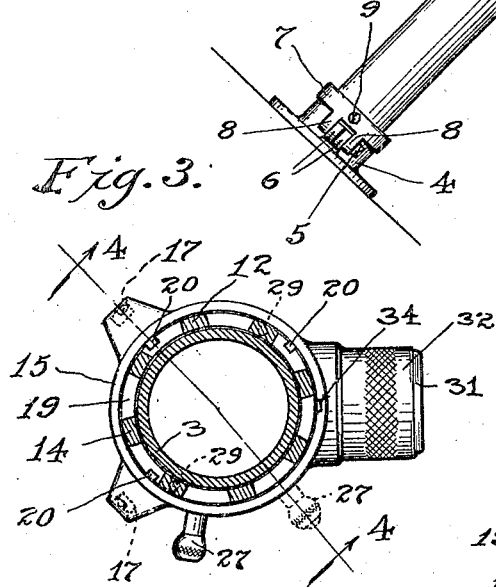
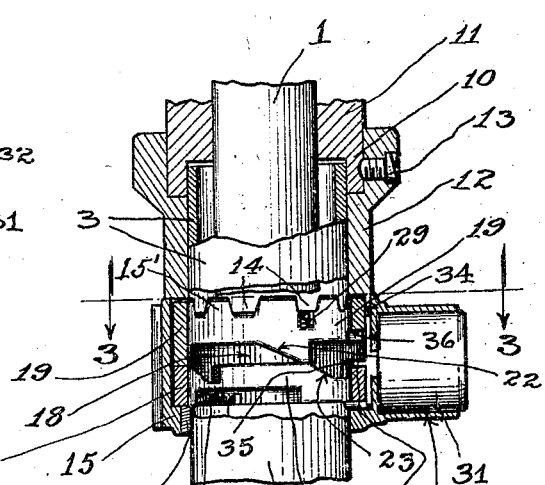
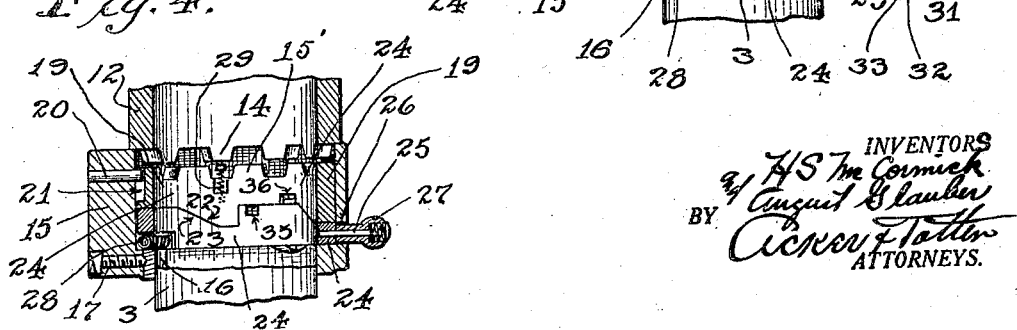
INVENTORS
H S McCormick
August Glauber
BY
ATTORNEYS.

UNITED STATES PATENT OFFICE.

HERBERT S. McCORMICK, OF ALAMEDA, AND AUGUST GLAUBER, OF OAKLAND, CALIFORNIA.

AUTOMOBILE STEERING-WHEEL LOCK.

1,411,047.  Specification of Letters Patent.  Patented Mar. 28, 1922.

Application filed April 5, 1920. Serial No. 371,346.

*To all whom it may concern:*

Be it known that we, HERBERT S. McCORMICK and AUGUST GLAUBER, citizens of the United States, residing the said McCORMICK at Alameda, in the county of Alameda and State of California, and the said GLAUBER at Oakland, county of Alameda, State of California, have invented certain new and useful Improvements in Automobile Steering-Wheel Locks, of which the following is a specification.

The present invention relates to an improved lock for precluding the operation of motor vehicle steering wheels by unauthorized persons when the owner or operator desires to leave the car. Heretofore it has been possible in the use of devices for locking a vehicle steering wheel from movement to easily defeat the objects of the lock by releasing the finishing tube to which the lock is secured and permit the same to rotate in its support, and one of the objects of the present invention is to provide a construction whereby this releasing of the finishing tube is prevented.

A further object is to provide a lock construction adapted for readily positioning one part on the steering post finishing tube and another part associated with the steering wheel whereby alterations in the steering wheel construction and finishing tube are not required.

A further object is to provide a construction wherein a simple cam member is capable of manual operation to position the parts in locking relation, and is automatically released on the unlocking or releasing of a key actuated mechanism.

The invention consists primarily in a pair of toothed or serrated members, one held stationary, and the other movable relatively thereto, and capable of being moved into engagement and locked thereon, to prevent the movement of the movable member.

With the above mentioned and other objects in view, the invention consists in the novel construction and combination of parts hereinafter described, illustrated in the accompanying drawings, and set forth in the claims hereto appended, it being understood that various changes in the form proportion, size and minor details of construction within the scope of the claims may be resorted to without departing from the spirit or sacrificing any of the advantages of the invention.

To more fully comprehend the invention, reference is directed to the accompanying drawings, wherein—

Figure 1 is a view in elevation of the preferred embodiment of our invention applied to a vehicle steering post, and with the parts in locked position.

Figure 2 is a vertical sectional view taken on line 2—2 of Figure 1 with the parts in locked position.

Figure 3 is a sectional view taken on line 3—3 of Figure 2, with the parts in locked position.

Figure 4 is a vertical sectional view taken on line 4—4 of Figure 3, but with the parts in unlocked position.

In the drawings, wherein like characters of reference designate corresponding parts, the numeral 1 indicates a suitable steering post, to the upper end of which is secured the usual vehicle steering wheel 2. The steering post 1 is surrounded by a metallic finishing tube 3 supported at its lower end in a tube retaining collar 4 secured to any suitable support through which the steering post 1 passes. The support is preferably in the form of a split collar, and the adjustment of the screw 5 passing through the ears 6 of the collar frictionally retains the lower portion of the finishing tube 3 within the tube retaining collar 4. However, it is only necessary to release the screw 5 to permit the tube to be rotated in the collar.

To defeat this rotation of the tube within the collar, we prefer to employ the following mechanism:—A ring 7 of an interior diameter corresponding to the exterior diameter of the finishing tube 3 is slid over the same with its interlocking ears 8 positioned preferably one on each side of the ears 6 of the collar 4. A non-removable safety screw 9 is passed through an opening in the ring 7 and engages the finishing tube, thus preventing the rotation of the tube at such time as the interlocking ears 8 lie one on each side of the ears 6. The screw 5 is passed through openings in the interlocking ears 8, but the release of the screw 5 will not permit the rotation of the tube 3, as the same is locked by the screw 9. It is impossible to move the finishing tube 3 longitudinally of the steering post 1 on the release of the screw 5, as the same terminates under and within an annular flange 10 of the hub 11 of the steering wheel 2.

Secured to the flange 10 of the hub 11 of the steering wheel 2 is a suitable ring engaging collar or cylinder 12 held in position to rotate with the wheel 2 and hub 11 by suitable non-removable safety screws 13, the ends of which are preferably seated within the periphery of the hub 11. The lower end of the member 12 is serrated or toothed as at 14, Figures 2 and 4 of the drawings. Surrounding the finishing tube 3 adjacent its upper end and immediately below the teeth 14 of the member 12 is a suitable body 15 cylindrical in form, and at its lower end is of a diameter to receive the finishing tube 3 with a sliding fit. The inner surface of the lower end of the body 15 is provided with a semi-circular clamping ring 16, the end portions of which are adapted to be forced in tight normal contact with the periphery of the tube 3 by the adjustment of the non-removable safety screws 17, which pass through openings in the wall of the body 15.

It will be understood from the above description that the member 12 is mounted to rotate with the hub 11, steering wheel 2 and post 1, while the body 15 is held stationary on the tube 3, and is prevented from axial movement thereon.

The upper portion of the body 15 is provided with an interior annular chamber 18 in the upper end of which is mounted a locking ring 19 free to move vertically within the chamber 18 and prevented from rotative movement therein axially of the tube 3 by suitable guide pins 20 receivable in vertical grooves 21 in the periphery of the ring 19. The ring is formed on its upper surface with teeth or serrations 15' which are adapted to cooperate with corresponding teeth or serrations 14 on the lower end of the member 12 when the steering wheel 1 is rotated to a position to place the teeth in staggered relation, as illustrated in Figure 2 of the drawings.

The lower edge of the ring 19 is formed with a plurality of surfaces 22 which cooperate with corresponding surfaces 23 formed on the upper surface of a cam ring 24 positioned within the base of the chamber 18 and mounted to rotate axially therein. The cam ring is adapted to be manually moved from the unlocked position Figure 4 into locked position Figure 2 of the drawings by the movement of a suitable gripping piece. This gripping piece is illustrated in the form of a stem 25 extending radially from the member 24 and operating in the slot 26 in the body 15, the length of the slot controlling the movement of the member 24 in its two positions. To retain the ring 24 in unlocked position, we mount a spring pressed finger piece 27 on the stem 25 and enlarge one end of the slot 26 to receive the inner end of the finger piece 27, as in Figure 4 of the drawings.

On the release of the lock controlled mechanism hereinafter described, the ring is automatically moved from locked to unlocked position by a coiled spring 28, and the ring 19 is automatically moved from locked position, Figure 2 of the drawings, to unlocked position, Figure 4, by suitable coiled springs 29.

To lock the member 24 from releasing when the same is manually moved from unlocked position, Figure 4, to locked position, Figure 2, we prefer to employ any suitable form of key operated barrel 30 rotatable within a locking cylinder 31 which is received in a suitable chamber 32 formed in the wall of the body 15, the cylinder 31 being held within its chamber in any suitable manner. The inner end of the barrel 30 is adapted when rotated to reciprocate a locking finger 33 carried in a groove 34 at one side of the chamber 18 and the finger 33 is adapted to be received in a recess in a notch 35 in the upper surface of the cam ring 24 when the same is in locked position, Figure 2 of the drawings, and is adapted to ride on the upper surface of said cam ring 24 when the same is in its unlocked position, Figure 4 of the drawings; the finger 33 being received in a notch 36 in the end surface of the locking ring 19 when the same moves downwardly from the locking position, Figure 2, to unlocking position Figure 4.

In operation, when the parts are assembled as in the drawings, the device is used in the following manner:—The vehicle operator turns the wheels of the vehicle by actuating the steering wheel 2, preferably toward the curb. He then grasps the member 27, pulls same outwardly and imparts a movement to the spindle 25 which causes an axial rotation of the cam ring 24 partially around the tube 3. This movement causes the teeth 14 and 15 to interlock and preclude the further steering movement of the wheel 2.

As the member 24 arrives at its extreme limit of manual operation, the finger 33 seats in the notch 35 locking the member 24 as in the position Figure 2 of the drawings.

To release or unlock the device to permit the use of the vehicle, a suitable key, not shown, is inserted in the barrel 30 and is rotated to raise the finger 33 from its notch 35, at which time the spring 28 automatically moves the member 24 from its position in Figure 2 of the drawings to its position in Figure 4 of the drawings, and the springs 29 forces the locking ring 19 downwardly disengaging the teeth 15 from the teeth 14.

We claim:—

1. A lock for locking the steering wheel and steering column members of a vehicle steering gear together, the same comprising a body for securing to one of said members and held from movement thereon, said body provided on its interior with an annular chamber opening at the upper end thereof, a collar secured to the other member and held from movement thereon and for closing said chamber, said collar provided on one edge with a plurality of teeth, a locking member carried by the body within the chamber and free to move therein to and from said collar into locked and unlocked position, a plurality of parts cooperating with the locking member for preventing rotative movement thereof and for guiding said member to and from said collar, said locking member provided with a plurality of teeth for engaging the teeth of said collar when said body is moved into locking position, a spring held finger piece for normally retaining said locking member in unlocked position and capable of manual operation and associated with said locking member for moving the same into locked position, and releasable lock controlled means associated with said manually operated means for automatically locking the same from movement when moved into operative position.

2. A vehicle steering wheel lock comprising a two part structure, one part secured to rotate with the steering wheel and the other part mounted adjacent to said first part on a fixed member, said first part provided with a plurality of teeth, a member mounted on said second part and held from rotation and capable of movement to and from said first part and provided with a plurality of teeth for engaging the teeth of the first part, means within said second part for operation to throw said member into locked and unlocked position, releasable lock controlled means for retaining said member in locked position, means for restoring said member to unlocked position on the release of said lock, and a spring held finger piece extended from said member and adapted for normally retaining the member in its released position.

In testimony whereof we have signed our names to this specification.

HERBERT S. McCORMICK.
AUGUST GLAUBER.